(12) United States Patent
Mazzarolo

(10) Patent No.: US 7,520,404 B2
(45) Date of Patent: *Apr. 21, 2009

(54) PAPER FOOD CONTAINER WITH INJECTION MOLDED TOP RIM STRUCTURE AND METHOD OF MANUFACTURING SAME

(76) Inventor: Ivonis Mazzarolo, 545 Ch. Del'anse, Vaudreuil, Quebec (CA) J7V 8P3

( * ) Notice: Subject to any disclaimer, the term of this patent is extended or adjusted under 35 U.S.C. 154(b) by 401 days.

This patent is subject to a terminal disclaimer.

(21) Appl. No.: 11/372,712

(22) Filed: Mar. 10, 2006

(65) Prior Publication Data

US 2007/0210091 A1     Sep. 13, 2007

(51) Int. Cl.
B65D 1/42     (2006.01)

(52) U.S. Cl. .................................................... 220/643

(58) Field of Classification Search ............. 220/62.22, 220/359.1, 359.3, 639, 640, 642–644, 656, 220/658, 659; 229/123.1; 264/273, 274
See application file for complete search history.

(56) References Cited

U.S. PATENT DOCUMENTS

| | | | |
|---|---|---|---|
| 4,094,460 A * | 6/1978 | Scanga et al. ............. | 229/123.1 |
| 4,238,047 A | 12/1980 | Helms ......................... | 220/306 |
| 4,346,832 A | 8/1982 | Werner ......................... | 229/4.5 |
| 5,156,273 A | 10/1992 | Mortensen .................... | 206/508 |
| 5,647,501 A | 7/1997 | Helms ........................ | 220/780 |
| 5,911,334 A | 6/1999 | Helms ....................... | 220/359.4 |
| 6,053,353 A | 4/2000 | Helms ......................... | 220/796 |
| 6,196,451 B1 | 3/2001 | Helms .................... | 229/125.13 |
| 6,471,083 B1 | 10/2002 | Helms ....................... | 220/259.1 |
| 6,516,548 B2 | 2/2003 | Lage et al. .................... | 40/324 |
| 6,523,713 B1 | 2/2003 | Helms ......................... | 220/831 |
| 2003/0192891 A1 | 10/2003 | Ziegler ........................ | 220/288 |
| 2004/0105917 A1 | 6/2004 | Mannion et al. ............. | 426/110 |
| 2004/0262322 A1 | 12/2004 | Middleton et al. .......... | 220/675 |
| 2005/0103792 A1* | 5/2005 | Sagol .......................... | 220/642 |

* cited by examiner

Primary Examiner—Anthony D Stashick
Assistant Examiner—Harry A Grosso
(74) Attorney, Agent, or Firm—Young Basile

(57) ABSTRACT

A food container in the form of a paper cup having a top edge and a plastic rim structure which is injection molded to the edge so as to firmly be adhered thereto. The rim structure exhibits a flat annular upper surface to which a heat sealable closure made of metal foil with heat sealable plastic underlayer can be attached after filling the container with a suitable food product. The mechanical attachment between the rim and cup is enhanced either by rolling the top edge prior to the molding steps, or forming holes in the cup just below the top edge in the paper blank.

6 Claims, 5 Drawing Sheets

PAPER FOOD CONTAINER WITH INJECTION MOLDED TOP RIM STRUCTURE AND METHOD OF MANUFACTURING SAME

FIELD OF THE INVENTION

This invention relates to food containers and more particularly to a cup-shaped paper container having an open top and a plastic rim structure which is injection molded in adhering and encapsulating relationship to the container sidewall at the top edge so as to be capable of receiving in sealed relationship therewith a heat sealable cover. The invention also relates to a method of manufacturing such an article and a method of packaging food using such an article.

BACKGROUND OF THE INVENTION

It is known to provide food products such as yogurt in plastic containers having sealed foil covers. However, the price of plastic used to manufacture such containers is closely tied to the price of oil which, for a number of years has seen a steady upward trend. It is therefore desirable to use paper containers provided they can meet the requirements associated with the packaging of food products. A problem with the use of paper is the attachment of a heat sealable foil cover to the container. That process requires a flat annular rim around the top of the container capable of sustaining a wide range of pressures and temperatures during the filling process of the food product. Paper alone does not provide this.

SUMMARY OF THE INVENTION

According to the first aspect of the present invention, an article of manufacture is provided in the form of a cup-shaped paper container having an open top, an injection molded plastic rim to receive a heat sealable cover of foil or other flexible, heat sealable membrane, and means for enhancing the mechanical adherence of the rim to the paper cup. The molded plastic rim structure is designed to provide a substantially flat, ring-shaped or annular upper surface which is capable of receiving in adhering relationship an impermeable covering material such as a metal foil with an under layer of heat sealable plastic.

In one illustrative embodiment, the enhancing means includes a rolled rim on the top edge of the paper cup. The molded plastic rim encapsulates the rolled rim and is securely fastened to the cup.

In a second illustrative embodiment, the enhancing means takes the form of a series of circumferentially-spaced holes in the cup sidewall just below the top edge. The plastic of the molded rim flows into the holes in the molding process and is preferably flush with the interior surface of the cup. In this embodiment the rolled rim is not necessary but may be used if desired.

According to the second aspect of the invention, an article of manufacture as described above is made by placing a paper cup having a top edge in a mold, closing the mold, and injecting into the mold a sufficient molten plastic material to form around and in encapsulating adhering relationship to the top edge, an annular rim having a substantially flat upper surface. The cup with the adhered plastic rim is thereafter removed from the mold and sent to a food processor where the cup is filled with food and sealed using a laminated foil covering structure as described above. Thus the invention includes not only the method of manufacturing the article, but the further and more comprehensive method of packaging food using such an article.

DETAILED DESCRIPTION OF A PREFERRED EMBODIMENT

Figure 1:
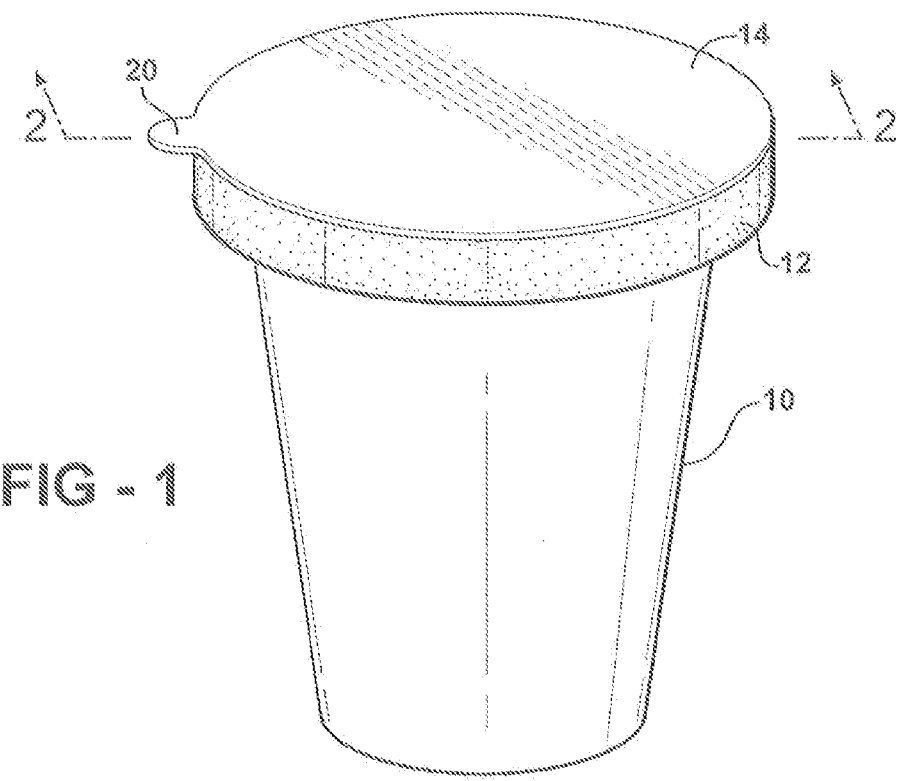
FIG. 1 is a perspective view of a food container manufactured in accordance with the present invention.
Figure 2:
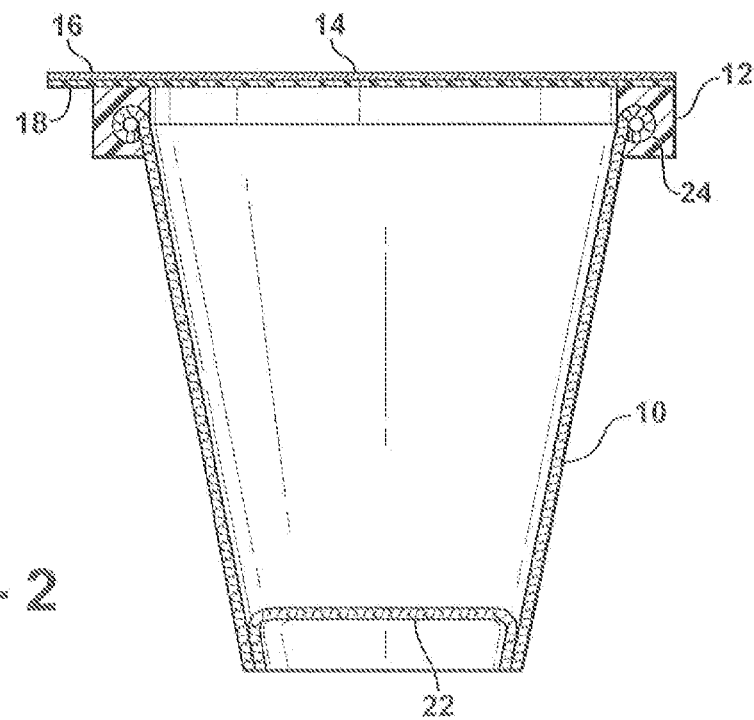
FIG. 2 is a side view in section of a first embodiment of the invention.

Referring to FIGS. 1 and 2 there is shown a tapered, cup-shaped paper container 10 having adheringly attached to the upper open end thereof an injection molded plastic rim structure 12 to which a heat sealable foil closure 14 has been attached. The closure 14 comprises an upper layer of metal foil and a lower layer of heat sealable plastic which is adhered to the flat top surface of the rim structure 12 by suitable heated press means (not shown). A lifting tab 20 is provided at the outer edge of the sealing cover 14 to assist in removing the cover 14 from the cup-shaped container 10 to provide access to the contents thereof. The cup-shaped container 10 is made substantially entirely of paper. The forming process for making paper cups is well known and involves rolling a flat blank into the proper shape and gluing or bonding the overlapping edges of the blank. A paper bottom 22 is added and secured in place by a suitable adhesive. At least the interior surfaces of the container 10 are sealed so as to become substantially impermeable by application of a plastic coating material selected from the group consisting of polyolefins, polyurethane and polyethylene. The term "cup shaped", as used herein, refers to cylindrical as well as tapered and reversely tapered containers.

According to a first embodiment, the upper edge of the container 10 is tightly rolled at 24. The manufacturing steps and equipment used to produce an article as thus far described are conventional and well known. In this embodiment, the rolled edge 24 acts as a means for enhancing the attachment of the rim structure 12.

Figure 3:
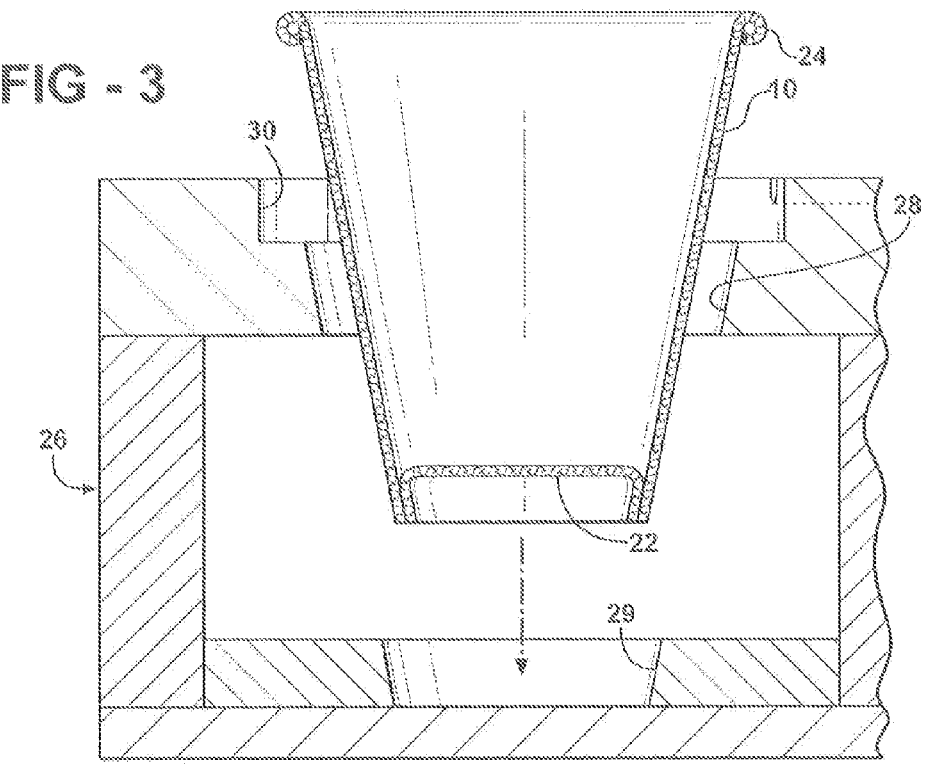
FIG. 3 is a side view in section of a paper cup of FIG. 2 being inserted into a mold.
Figure 4:
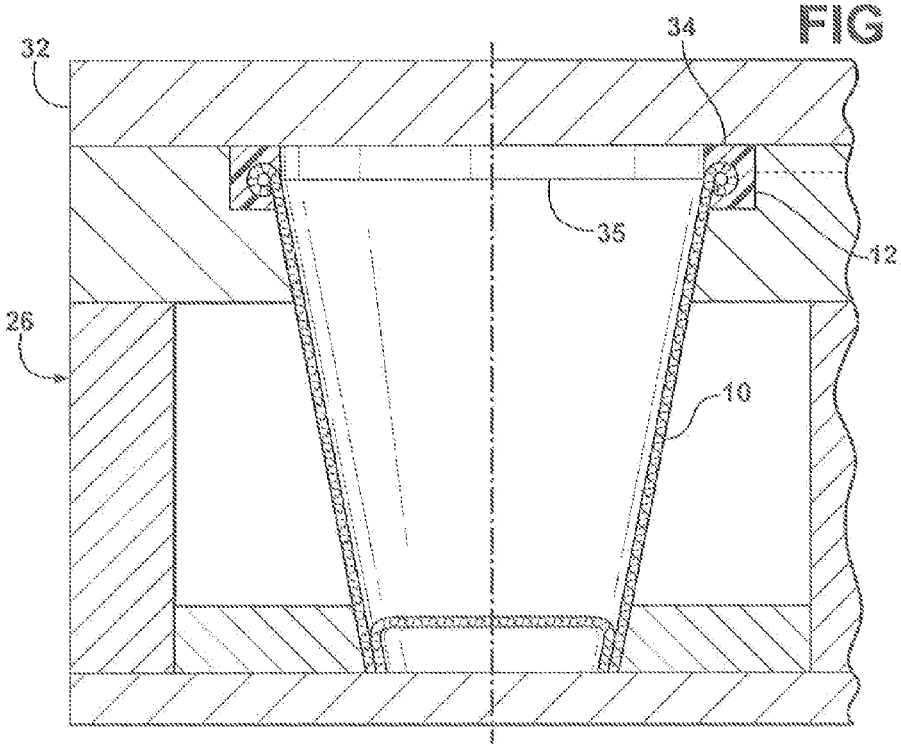
FIG. 4 is a side view in section of the paper cup of FIG. 3 after insertion into the mold and injection molding a rim structure.
Figure 5:
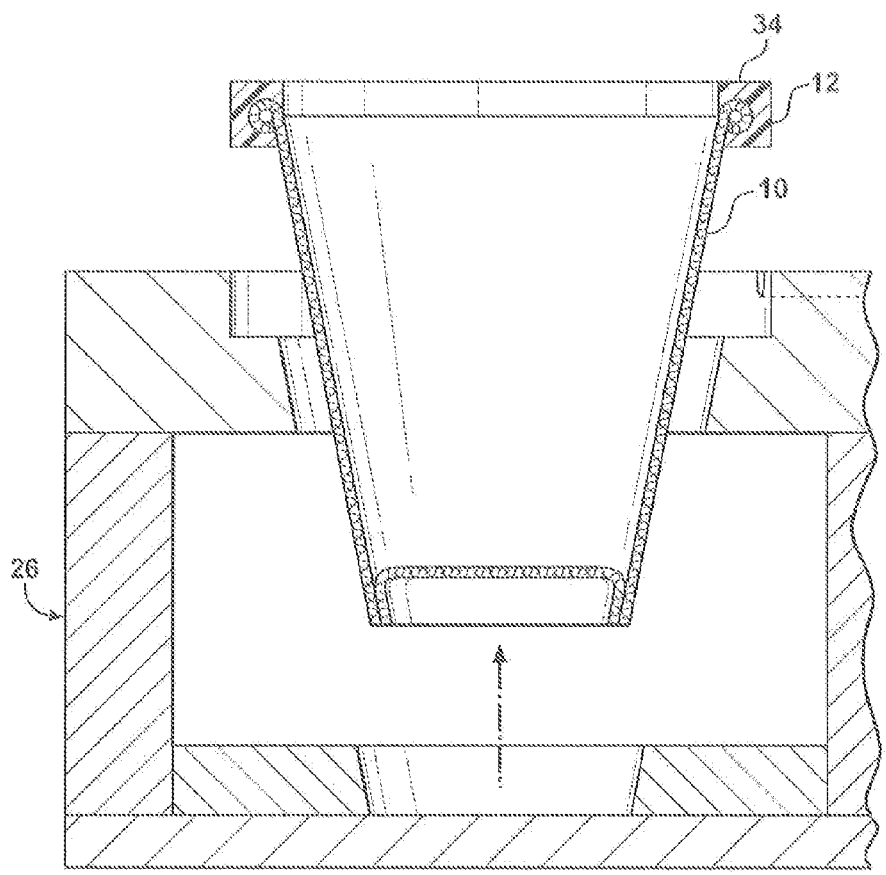
FIG. 5 is a side view in section of the open mold with the cup of FIG. 2 being removed from the mold.

Referring now to FIGS. 3, 4 and 5, the additional steps needed to convert the paper cup 10 into a food product container in accordance with the present invention will be described. As shown in FIG. 3, a suitable injection molding apparatus 26 capable of withstanding high pressure conditions is shown to comprise tapered support surfaces 28 and 29 sized and shaped to receive and support the cup-shaped paper container 10 therein. When fully inserted, the rolled rim 24 of the paper container lies within an annular upper cavity 30 in spaced relationship with all surfaces thereof.

Turning now to FIG. 4, the mold 26 is closed by adding a high pressure cover 32. A plug 35 attached to the mold cover 32 defines the inside surface of an annular mold cavity. The plug 35 touches the inside surface of the cup 10 and prevents plastic from flowing down the inside of the cup. Molten plastic material such as molten polyethylene is injected into the space between the cavity 30 and the upper, outer and lower quadrants of the rolled edge 24. This results in the formation of the plastic rim structure 12 in adhering and surrounding relationship to the rolled edge 24. It will be noted in FIG. 4 that the cover 32 forms a flat annular upper surface 34 on the injection molded rim structure 12. The radial width of the upper surface 34 is uniform and between about 1/8 and 1/4 of an inch.

As shown in FIG. 5, after the injection molding process has been completed, the mold 26 is opened and the finished article consisting of paper cup 10 and upper rim structure 12 is removed. Rim structure 12 is now well adhered to the cup 10 and will not shift, collapse or separate from the cup even when subjected to the forces associated with the application and removal of the cover 12. Moreover, it provides the advantage of a substantially flush relationship with the interior surface of the cup 10 such that it is easy to fully remove the contents of the cup with a spoon or other utensil.

Figure 6:
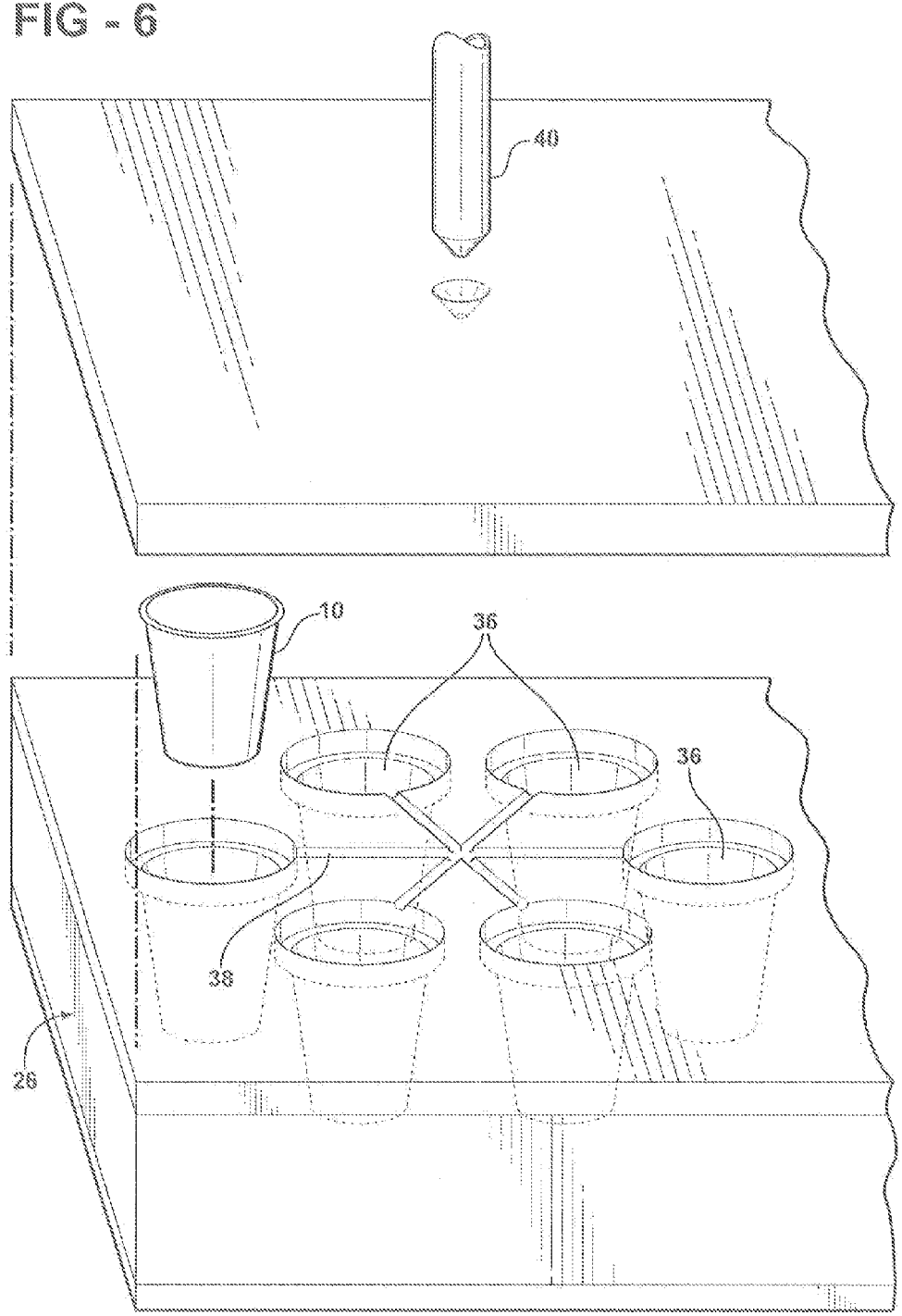
FIG. 6 is a perspective view of a representative mold showing how multiple articles incorporating the principals of the present invention are simultaneously formed.

FIG. 6 shows the mold 26 to comprise multiple mold cavities 36 interconnected by a runner system 38 which permits the simultaneous molding of six rim structures 12 in association with six identical paper cups 10. The injector 40 for the plastic material is shown.

Figure 7:
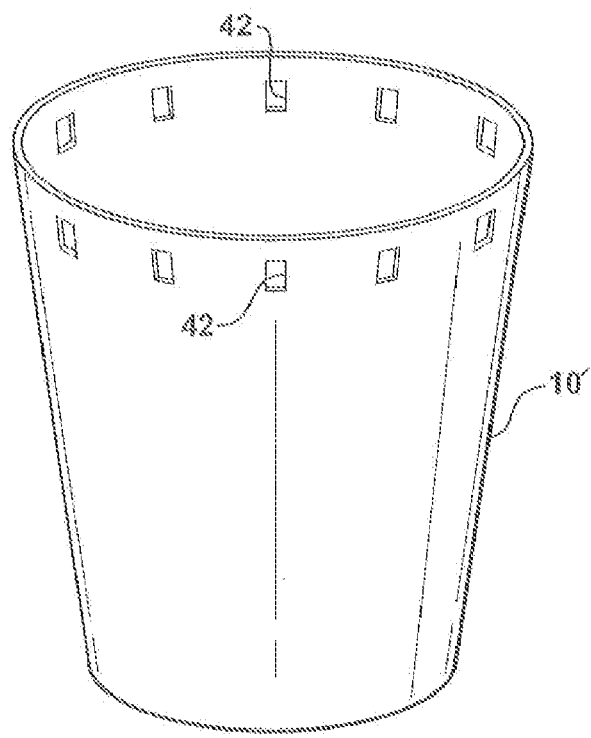
FIG. 7 is a perspective view of a second embodiment of a cup before injection molding the rim.
Figure 8:
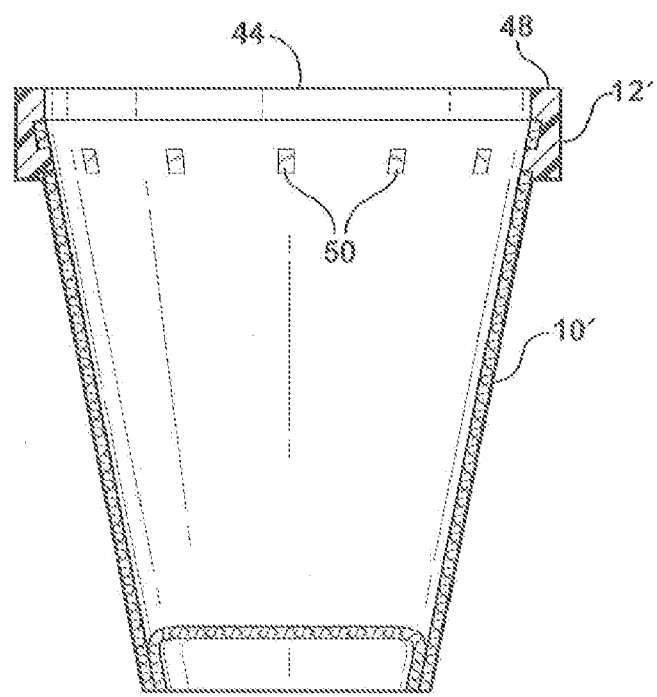
FIG. 8 is a side view, in section, of the cup of FIG. 7 after molding the rim structure.

Referring now to FIGS. 7 and 8, a second embodiment of the invention will be described. In this embodiment, a paper cup 10' is constructed according to the description above except for the fact that the top edge is not rolled. Instead, a plurality of circumferentially spaced holes 42 are formed in the paper sidewall about 1/8 of an inch below the upper edge 44. The holes are preferably formed in the paper blank before it is rolled into the cup shape. The cup is inserted into a mold similar to that shown in FIGS. 3-5 and a rim structure 12' having a flat annular top 48 is injection molded to the top of the cup 10 such that injected plastic flows into the holes 42 to form plugs 50 which enhance the mechanical attachment of the rim 12' to the paper cup 10. In this embodiment, the edge 44 is not rolled. However, both the rolled rim 24 and the holes 42 may be used in combination if desired.

After the article shown in either FIG. 5 or FIG. 8 is manufactured, it is shipped to food processor who fills the container with a suitable food product such as yogurt. Thereafter, the container is sealed by applying the foil cover 14 to the flat annular rim surface 34 or 48 and applying a heated press or platen to the article to bond or weld the plastic under material 18 to the top surface 34 or 48 of the polyethylene rim structure 12 or 46. Polyethylene is given by way of example as other injectable plastics may also be used.

The purchaser of the food product in the container holds the container 10 in one hand and grasps the tab 20 in the other hand and peels it back to remove the cover 14 from the cup-shaped container 10. The forces involved in disassociating the bonded plastic under layer from the rim structure 12 are far less than those which would be required to mechanically disassociate the rim structure 12 from the rolled rim 24 in view of the enhanced attachment described herein. Thus, the food container has the structural integrity of a full plastic article while being susceptible of manufacture at a reduced price.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A food container comprising the combination of:
   a cup-shaped paper container having an outer surface, an inner surface, a closed bottom and an open top terminating in a peripheral annular edge; and
   an annular plastic ring structure directly injection-molded to and around the peripheral annular edge of the container and defining a substantially flat annular upper surface wherein the injection molded ring structure overlies the upper annular edge and extends downwardly along and in adhering contact to the outer surface of the cup but is substantially flush with the inside surface of the cup immediately adjacent the annular edge.

2. A food container as defined in claim 1 wherein the annular edge is rolled.

3. The food container article of claim 1 further including an impermeable coating material on the interior of the cup selected from the group consisting of polyolefins, polyurethane, and polyethylene.

4. The food container article of claim 1 further including a heat-sealed foil cover.

5. A food container as defined in claim 1 further including a rolled edge on the paper cup.

6. A food container as defined in claim 1 further comprising a plurality of circumferentially spaced holes formed in the cup below the edge such that the plastic rim structure fills said holes.

* * * * *